United States Patent
Hoyer et al.

[11] 4,015,195
[45] Mar. 29, 1977

[54] METHOD OF DETERMINING HYDROCARBON SATURATION IN SHALY FORMATIONS BY MEASURING DIELECTRIC CONSTANT IN FIRST AND SECOND PORTIONS OF THE FORMATIONS

[75] Inventors: Wilmer A. Hoyer, Houston; Michael M. Spann, Stafford, both of Tex.

[73] Assignee: Exxon Production Research Company, Houston, Tex.

[22] Filed: June 3, 1976

[21] Appl. No.: 692,616

Related U.S. Application Data

[63] Continuation-in-part of Ser. No. 554,997, March 3, 1975, abandoned.

[52] U.S. Cl. .................................. 324/1; 324/5; 324/13
[51] Int. Cl.² ......................... G01V 3/18; G01V 3/06; G01N 27/00
[58] Field of Search ................... 324/1, 5–7, 324/10, 13

[56] References Cited
UNITED STATES PATENTS

| | | |
|---|---|---|
| 2,689,329 | 9/1954 | Zimmerman .......................... 324/5 |
| 2,749,503 | 6/1956 | Doll ...................................... 324/1 |
| 2,766,421 | 10/1956 | Wait et al. ............................ 324/1 |
| 3,075,142 | 1/1963 | Albright et al. ...................... 324/1 |
| 3,166,708 | 1/1965 | Millican ............................... 324/1 |
| 3,180,141 | 4/1965 | Alger ................................ 324/1 X |
| 3,699,429 | 10/1972 | Ratz ..................................... 324/5 |
| 3,895,289 | 7/1975 | Rickey et al. ................... 324/13 X |
| 3,973,181 | 8/1976 | Calvert ................................. 324/5 |

FOREIGN PATENTS OR APPLICATIONS

1,088,824   10/1967   United Kingdom .................. 324/5

*Primary Examiner*—Gerard R. Strecker
*Attorney, Agent, or Firm*—E. Eugene Thigpen

[57] ABSTRACT

In a subsurface formation, where shaliness affects the results of typical electrical well logging measurements, partial water and partial hydrocarbon saturations are determined from measurements of dielectric constant. The relation between dielectric constant and conductivity due to shaliness in a partially water saturated formation and a relation defining dielectric constant change as a function of partial water saturation are used to determine partial water saturation and partial hydrocarbon saturation of said formation.

29 Claims, 11 Drawing Figures

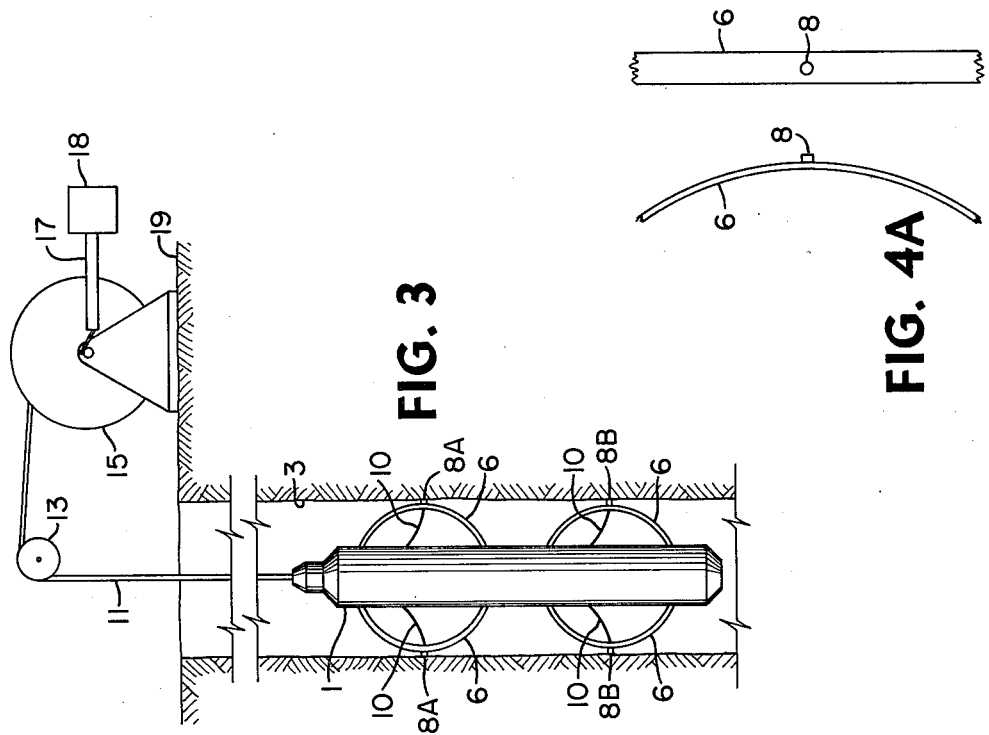

METHOD OF DETERMINING HYDROCARBON SATURATION IN SHALY FORMATIONS BY MEASURING DIELECTRIC CONSTANT IN FIRST AND SECOND PORTIONS OF THE FORMATIONS

CROSS-REFERENCE TO RELATED APPLICATION

This application is a continuation-in-part of U.S. patent application Ser. No. 554,997, filed Mar. 3, 1975, now abandoned.

BACKGROUND OF THE INVENTION

A technique typically employed to determine the presence of hydrocarbons in earth formations is to electrically log boreholes drilled in these formations. Normally, formations saturated mostly with hydrocarbons will exhibit a high electrical resistivity, while formations saturated mostly with water or brine will exhibit a low electrical resistivity. However, it has been determined that the presence of shale in a formation substantially decreases the resistivity of the formation to the extent that commercially producing reservoirs in shaly formations display a resistivity that would otherwise indicate nonproductivity.

U. S. Pat. No. 3,895,289, issued July 15, 1975, discloses a relation between dielectric constant of a shaly sand formation, 100% water saturated, and a conductivity parameter related to shaliness, and provides a method of determining if there is enough shale in a formation that it must be taken into account when evaluating electrical logging results; but does not disclose a method for quantitatively determining the partial hydrocarbon saturation and partial water (brine) saturation of the formation.

BRIEF DESCRIPTION OF THE DRAWINGS

FIG. 1 is a schematic representation of logging equipment arranged in a borehole and at the earth's surface to conduct earth measurements in accordance with the present invention.

FIGS. 2A and 2B illustrate side and front views of a bow spring suitable for use with the apparatus of FIG. 1.

FIG. 3 is another schematic representation of logging equipment arranged in a borehole and at the earth's surface to conduct earth measurements in accordance with the present invention.

FIGS. 4A and 4B illustrate side and front views of a bow spring for use with the apparatus of FIG. 3.

SUMMARY OF THE INVENTION

Figure 5A:
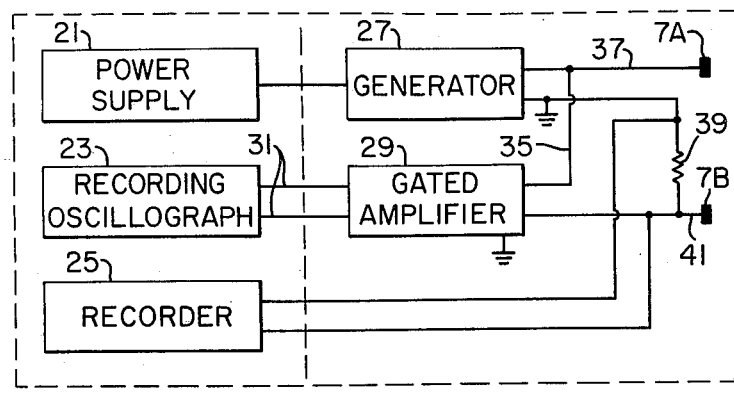
FIG. 5A is an electrical diagram, partially in schematic and partially in block form, of electrical equipment suitable for use in connection with the equipment of FIGS. 1, 2A, 2B, 3, 4A and 4B.

The degree of water (brine) saturation of a subsurface formation saturated partially with an aqueous saturant and partially with electrically inert matter is determined from measurements of dielectric constant.

It has been discovered that the dielectric constant of a shaly sand formation changes as a function of water (brine) saturation, and that this variation is defined by the relation $K/K_o = S_\omega{}^p$, where:

$K$ = dielectric constant
$K_o$ = dielectric constant at 100% water saturation
$S_\omega$ = water saturation
$P$ = shaliness exponent It has also been discovered that within the salinity range normally encountered in the formations of interest, this relation is not significantly affected by a change in salinity of the saturating aqueous solution.

When a borehole is drilled into a formation, normally the formation fluids in the vicinity of the borehole wall will be displaced by drilling fluids. In a formation saturated with fluid saturants, such as water and fluid hydrocarbons, partial water saturation of the formation can be determined from "shallow" measurements of dielectric constant near the borehole wall, and from deeper measurements of dielectric constants in portions of the formation not penetrated by drilling fluids, if the value of $p$ is known for the formation.

In another embodiment of the invention, partial water saturation is determined utilizing only "deep" dielectric constant measurements. In this embodiment, the conductivity relation for a partially water saturated shaly sand formation:

$$C_t = (1/F^*)(c_\omega S_\omega{}^n + C_c S_\omega{}^p)$$

is employed, where:

$C_t$ = specific conductivity of the shaly sand formation, mho cm$^{-1}$
$F^*$ = formation resistivity factor for shaly sands
$C_\omega$ = specific conductivity of the aqueous saturant, mho cm$^{-1}$
$S_\omega$ = partial water saturation
$n$ = desaturation exponent
$C_c$ = specific conductivity due to shaliness, mho cm$^{-1}$ The value of $C_t$, $F^*$, $C_\omega$ are obtained from routine well logging methods. Although the value of $n$ varies somewhat for different types of shaly sand, it has been determined that a value of 2 2 can be used for $n$ without introducing excessive error. The quantity $C_c S_\omega{}^p$ has been found to be related to dielectric constant, and the value thereof is directly determinable by correlating the measured dielectric constant with the relation between dielectric constant and $C_c S_\omega{}^p$. From the information thus obtained, $S_\omega$, the aqueous portion of formation saturants, can be calculated. The correlation between the conductivity parameter $C_c S_\omega{}^p$ and dielectric constant varies with temperature and, to a lesser extent, with porosity. The appropriate correlation between shaliness conductivity, $C_c S_\omega{}^p$, and dielectric constant for the reservoir of interest must be selected.

By utilizing the deep and "shallow" dielectric constant measurements, partial water saturation of a formation may also be determined without assuming 100% aqueous saturation of the invaded zone where the shallow measurement is made. The value of $S_\omega$ in the invaded zone may be determined from the relation:

$$C_t = \frac{1}{F^*}(C_\omega S_\omega^\eta + C_c S_\omega^p)$$

The value of $S\omega$ in the uninvaded formation may then be determined from the relation:

$$S_\omega = (K/K_i S_{\omega_i})$$

in which the subscript $i$ refers to the invaded zone.

By utilizing the deep and shallow dielectric constant measurements, partial water saturation of the formation may also be determined without knowing the formation factor or assuming 100% aqueous saturation of the invaded zone. Again, using the subscript $i$ to indicate the invaded zone $$C_{t_i} = \frac{1}{F^*}(C_{\omega_i} S_{\omega_i}^\eta + C_{c_i} S_{\omega_i}^p)$$

A ratio may be formed as follows:

$$\frac{C_{t_i}}{C_t} = \frac{C_{\omega_i} S_{\omega_i}^\eta + C_{c_i} S_{\omega_i}^p}{C_\omega S_\omega^\eta + C_c S_\omega^p}$$

As described above $S_{\omega_i} = S_\omega (K_i/K)$

To determine a value $S_\omega$, values of $C_{t_i}$, $C_t C_{\omega_i}$, and $C_\omega$ need to be determined utilizing techniques available from the prior art.

DESCRIPTION OF THE PREFERRED EMBODIMENT

A commonly used equation for shaly sands, 100% saturated with an aqueous solution, is as follows:

$$C_o = \frac{1}{F^*}(C_\omega + BQ_v)$$

The paper entitled "Electrical Conductivities in Oil Bearing Shaly Sands" by M. H. Waxman and L. J. M. Smith, *Society of Petroleum Engineers Journal*, June, 1968, page 107 describes the theoretical basis for this equation. In the equation, the terms have the following meanings:

$C_o$ = specific conductivity of shaly sand, 100% saturated with aqueous solution, mho cm$^{-1}$ $F^*$ = formation resistivity factor for shaly sand, which has been found to be related to porosity, $\phi$, by what is known as Archie's first empirical equation $$F^* = \phi^{-m}$$

(See Archie, G. E., "The Electrical Resistivity Log as an Aid in Determining Some Reservoir Characteristics," Trans., AIME (1942), Vol. 146, p. 54–67. The constant, $m$, has a value of approximately 2, but varies somewhat depending on the sand characteristics.)

$C_\omega$ = specific conductivity of the saturating aqueous solution, mho cm$^{-1}$ $Q_v$ = cation exchange capacity per unit pore volume, meq ml$^{-1}$ $B$ = equivalent conductance of clay exchange cations as a function of $C_\omega$ at 25° C, mho cm$^2$ meq$^{-1}$ The conductivity parameter, $BQ_v$, represents the conductivity due to shaliness in the formation of interest. As disclosed in U.S. Pat. No. 3,895,289, Rickey, et al, a relationship exists between this shaliness conductivity, $BQ_v$, and dielectric constant measured at frequencies less than about 50 KHz. As also disclosed in the Rickey patent, dielectric constant is related to cation exchange capacity, $Q_v$. It has been found however, that for at least some types of shaly sand reservoirs, $Q_v$ is no longer determinable from dielectric constant measurements and that shaliness conductivity can not be represented as a simple function of cation exchange capacity. However, dielectric constant remains an accurate indicator of shaliness conductivity. Therefore, a more general equation for representing the conductivity of shaly sand will henceforth be used, as follows:

$$C_o = (1/F^*)(C_\omega + C_c)$$

wherein the terms have the previously stated meanings, except that:

$C_c$ = specific conductivity due to shaliness at 100% water saturation, mho cm$^{-1}$ It should be recognized that for many formations, particularly those having relatively low concentrations of shale, $C_c$ will be substantially equal to $BQ_v$.

By determining the value of $C_c$ for a number of shaly sand earth samples and the corresponding value of dielectric constant for each sample, a correlation can be prepared that permits a determination of the value of the conductivity due to shaliness of an earth formation from a measurement of dielectric constant.

Figure 8:
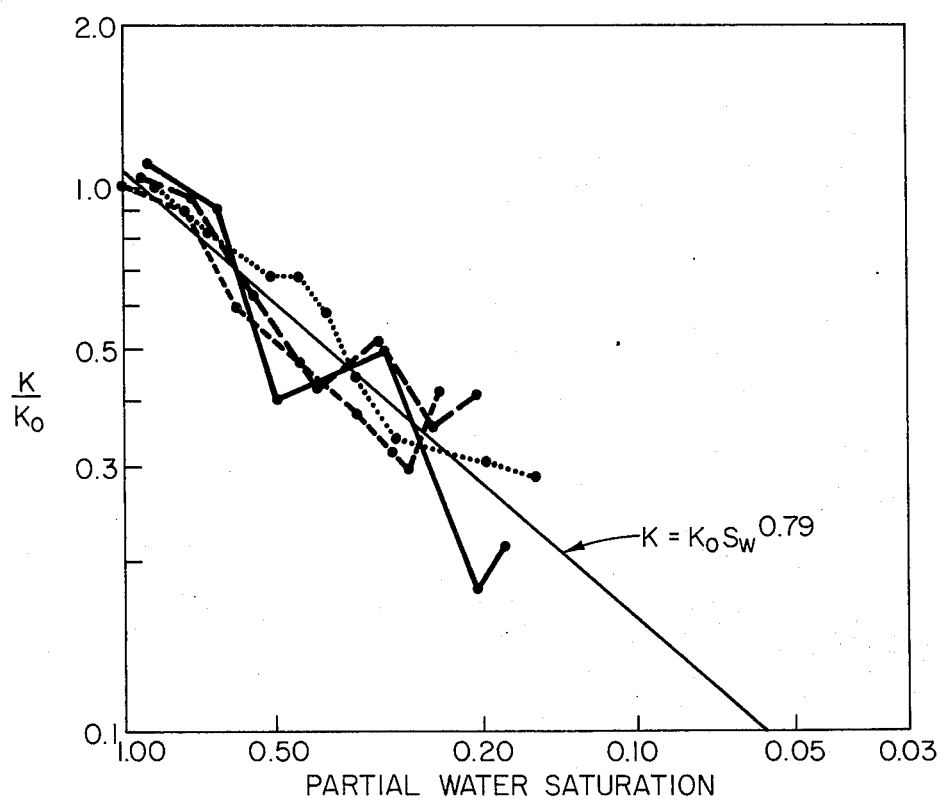
FIG. 8 is a graphical representation of the measured change in dielectric constant with partial water saturation for four shaly sand formation samples.

We have determined experimentally that the dielectric constant of a shaly sand formation also varies as a function of water saturation. The dielectric constant of shaly sand formation samples measured at water saturation less than 100% has been found to be related to dielectric constant measured at 100% water saturation, by the relation:

$$K = K_o S_\omega^p$$

where:

$K$ = dielectric constant $K_o$ = dielectric constant at 100% water saturation $S_\omega$ = partial water saturation $p$ = shaliness exponent FIG. 8 is a graphical representation of the change in dielectric constant with a change in water saturation for a particular set of shaly sands. As indicated above $K_o$ represents dielectric constant at 100% water saturation. A value for $K_o$ is determined by saturating a core extracted from a formation of interest with a 100% aqueous solution and then measuring the dielectric constant of the saturated core. Values for dielectric constant, $K$, at selected values of partial water saturation are determined by saturating the core with a mixture of water and an electrically inert fluid, such as oil or air. For a partial water saturation of 0.50, for instance, the saturating fluid would be 50% water and 50% electrically inert fluid. The graph in FIG. 8 was generated by measuring cores at varying levels of partial water saturation. This graph indicates a value for $p$ of about 0.8, but the value of $p$ may be different for other formations having different textures, clay distribution, or other characteristics. From information available at this time it appears that the value of $p$ can vary from 0.7 to 1.3.

It has also been determined experimentally that this relation is not substantially affected by a change in salinity of the water. This discovery is of particular significance because it permits partial water saturation to be determined from measurements of dielectric constant.

The measured dielectric constant does, however, change as a function of the frequency of the electrical signal used for measuring dielectric constant. Dielectric constant has been observed to decrease with increasing frequency. At frequencies above about 50 KHz, dielectric constant resulting from shaliness may not be great enough to be useful in practicing the invention. It is important that all dielectric constant measurements be made at the same frequency for any set of formation evaluations.

During normal well drilling operations, native formation fluids adjacent the wellbore will be displaced by drilling fluids. If water based drilling fluids are used, a portion of the formation adjacent the wellbore normally will become nearly 100% water saturated. Values for $K_o$ can then be determined by measuring dielectric constant in said portion of a formation adjacent the borehole. If cores are available, values for $K_o$ may also be determined by fully saturating the cores with water and measuring dielectric constant. Values of $K_o$ may also be determined from a 100% water saturated water leg if one is present in the formation. By measuring dielectric constant in substantially the same portion of the formation, but at a depth from the borehole surface not penetrated by drilling fluids, the partial water (brine) saturation of the formation can be determined for any shaly sand formation having a known value of $p$.

This embodiment of the invention, therefore, permits the partial water saturation of a shaly sand formation saturated partially by water and partially by an electrically inert fluid to be determined. The electrically inert fluid portion of such formation saturants, which may be fluid hydrocarbons, is, therefore, equal to $1-S_\omega$. Partial hydrocarbon saturation is hereafter referred to as $S_H$.

It is understood that if the electrically inert saturant is comprised of solid matter that will not be displaced by the aqueous drilling fluid, the shallow dielectric constant measurement as described hereinabove may not determine an accurate value for $K_o$. However, values for $K_o$ may be determined from cores, or by measuring dielectric constant in an adjacent zone in said formation that is water saturated, if such a water leg exists.

Partial water saturation is also determinable utilizing only the deep dielectric constant measurement. Although additional well-logging information must be known, partial water saturation can be determined in formation zones partially saturated by a solid electrically inert saturant, such as kerogen, when no water leg is present in said formation. The following discussion should be of assistance in understanding this embodiment of the invention.

In 1942, Archie (see Archie, G. E., supra) proposed that the resistivity index of clean (nonshaly) sandstone partially saturated with water follows the relation:

$$\frac{R_t}{R_o} = \frac{1}{S_\omega^n} \qquad (1)$$

where:
$R_t$ = resistivity of a partially water saturated formation, ohm–m
$R_o$ = resistivity of a 100% water saturated formation, ohm–m
$S_\omega$ = partial water saturation
$n$ = desaturation exponent (equal to about 2 for nonshaly sandstone formations)

Rewriting this equation in terms of conductivity:

$$C_t = C_o S_\omega^n \qquad (2)$$

Another parameter which has been found to be useful is the formation factor, $F$. Formation factor for nonshaly sands is defined as:

$$F = (R_o/R_\omega) \qquad (3)$$

where:
$R_o$ = resistivity of a 100% water saturated formation, ohm–m
$R_\omega$ = resistivity of the saturating water, ohm–m Rewriting equation (3) in terms of conductivity:

$$C_o = (1/F) C_\omega \qquad (4)$$

and substituting the value of $C_o$ from equation (2) into equation (4):

$$C_t = (1/F) C_\omega S_\omega^n \qquad (5)$$

which is the equation of conductivity of partially brine saturated nonshaly sandstone formation.

By using the relationship that has been found to exist between dielectric constant at partial water saturation, and dielectric constant at 100% water saturation, shaliness effects on the conductivity of partially water saturated formations can be taken into account. As indicated above, dielectric constant in a 100% water saturated formation, $K_o$, is proportional to the shaliness conductivity, $C_c$, from the relation:

$$C_o = (1/F^*)(C_\omega + C_c) \qquad (6)$$

As stated hereinabove, dielectric constant, $K$, also changes with decreasing water saturation according to the relation:

$$K = K_o S_\omega^p \qquad (7)$$

It follows, therefore, that since dielectric constant changes with water saturation by the factor, $S_\omega^p$, the conductivity due to shaliness, also changes with water saturation by this same factor. Therefore, the complete equation for the conductivity of shaly sand, $C_t$, partially saturated with brine and partially saturated with an electrically inert saturant can be written in the form:

$$C_t = (1/F)(C_\omega S_\omega^n + C_c S_\omega^p) \qquad (8)$$

To determine partial water saturation of a formation using this equation, alone, certain information routinely obtained from well logs is necessary. The value of $C_t$ is obtained from resistivity logs. The value of $F^*$ is determined from porosity which is routinely determined for each reservoir. The value of $C_\omega$, the water conductivity, is determined from actual measurements of the brine that is present in the reservoir, or from the s.p. (self potential) log. The value of $n$ has been experimentally determined to be approximately equal to 2 in shaly sandstone formations.

The value of the term $C_c S_\omega{}^p$ is determined from dielectric constant measurements as disclosed herein. After the value of the term $C_c S_\omega{}^p$ is determined, the value of all the terms in the equation:

$$C_t = 1/F^* (C_\omega S_\omega{}^n + C_c S_\omega{}^p) \tag{9}$$

are now known except for $S_\omega$, the partial water saturation, which can now be calculated. The fractional portion of the saturants composed of electrically inert matter is equal to $1-S_\omega$. For a formation saturated with water and hydrocarbon, the foregoing method provides a method of quantitatively determining the amount of hydrocarbons present in the formation.

As stated hereinabove:

$$C_t = 1/F^* (C_\omega S_\omega{}^n + C_c S_\omega{}^p) \tag{10}$$

As used hereinafter, the subscript $i$ will refer to the particular value or measurement in the invaded zone adjacent the borehole. In another embodiment of the invention, the partial water saturation can be determined in the invaded zone from the equation:

$$C_{t_i} = 1/F^* (C_{\omega_i} S_{\omega_i}{}^n + C_{c_i} S_{\omega_i}{}^p) \tag{11}$$

After the value of $S_{\omega_i}$ is so determined, then the value of $S_\omega$, the partial water saturation of the formation can be readily determined from the two dielectric constant measurements, from the deep and shallow (invaded) zones, since:

$$K = K_a S_\omega{}^p \tag{12}$$

$$K_i = K_a S_{\omega_i}{}^p \tag{13}$$

and $$\frac{K}{K_i} = \frac{S_\omega}{S_{\omega_i}} \tag{14}$$

therefore;

$$S_\omega = \frac{K S_{\omega_i}}{K_i} \tag{15}$$

Additionally, the two relations:

$$C_t = \frac{1}{F^*} (C_\omega S_\omega{}^n + C_c S_\omega{}^p)$$

and $$K = K_a S_\omega{}^p$$

can be utilized to determine partial water saturations in the formation from measurements of dielectric constant in the deep and shallow zones without requiring a determination of formation factor. Again the subscript $i$ refers to the invaded zone, so that:

$$C_{t_i} = \frac{1}{F^*} [C_{\omega_i} S_{\omega_i}{}^n + C_{c_i} S_{\omega_i}{}^p] \tag{16}$$

the following ratio can be formed utilizing the conductivity relations for the invaded and uninvaded zones:

$$\frac{C_{t_i}}{C_t} = \frac{C_{\omega_i} S_{\omega_i}{}^n + C_{c_i} S_{\omega_i}{}^p}{C_\omega S_\omega{}^n + C_c S_\omega{}^p} \tag{17}$$

From equation (15)

$$S_{\omega_i} = S_\omega \frac{K_i}{K} \tag{18}$$

The values for $C_{c_i} S_{\omega_i}{}^p$ and $C_c S_\omega{}^p$ are determined from the dielectric constant measurements. Values for $C_t$, $C_{t_i}$, $C_\omega$, and $C_{\omega_i}$ are determinable from techniques available from the prior art which do not constitute a part of this invention. As stated hereinabove, a value of 2 can normally be used for $n$. The value of $S_\omega$, the partial water saturation of the formation may then be calculated from equation (17).

In order to practice this invention, it is necessary to measure the dielectric constant of a formation.

FIG. 1 illustrates apparatus for making shallow dielectric constant measurements. The apparatus is comprised of an elongated housing 1 to which is affixed in the usual manner a number of bow springs 5 each of which carries a plurality of electrode contacts 7A and 7B (see FIGS. 2A and 2B) positioned on the bow springs so as to be urged into contact with the walls of a borehole 3. The housing 1 is suspended from a logging cable 11 which is wound on a reel drum 15 which extends over a sheave 13 in the usual manner so as to be suitably positioned in the borehole. Electrical leads within the logging cable 11, that conduct electrical signals from the downhole equipment contained in housing 1, are connected to electrical leads within an electrical conduit 17, which in turn, connect to the surface electrical equipment package 18. Electrical equipment package 18 may include, among other things, suitable recording and display apparatus.

The electrodes 7A and 7B on the bow springs 5 are supported by electrical insulators and are spaced apart a sufficient distance so that electrical currents and flux lines flowing therebetween will penetrate the desired distance into the earth formation. This spacing may preferably be about 5 inches. Electrodes 7A and 7B are connected to electrical leads 9 which are electrically insulated from any borehole fluids. Leads 9 connect into the downhole electronic equipment contained in housing 1.

FIG. 3 illustrates apparatus for making deep dielectric constant measurements, in a portion of the formation not penetrated by drilling fluids. This apparatus is identical to the apparatus in FIG. 1 except that the electrode contacts are spaced further apart. Each of the bow springs (see FIGS. 4A and 4B) contains only one of the electrodes of an electrode pair. Electrical currents and flux lines will flow between electrode 8A located on an upper bow spring and electrode 8B positioned on a lower bow spring. The spacing between the electrodes of an electrode pair may preferably be about 5 feet.

FIG. 5A illustrates an electrical schematic diagram, partially in block form, of apparatus suitable for use with the apparatus previously described for measuring capacitance in a borehole, from which dielectric constant is determined. The apparatus shown in FIG. 5A is divided into two sections, the surface equipment and the downhole equipment. The surface equipment is connected to cable 17 (shown in FIGS. 1 and 3) and interconnected with the downhole equipment through cables 17 and 11, and electrical leads inside housing 1. The surface equipment includes power supply 21 which preferably is a DC supply, recording oscillograph 23 and recorder 25 for making a time recording of a voltage derived from the downhole equipment. Power supply 21 is electrically connected through the cables 17 and 11 to rectangular wave generator 27 within the housing 1. Rectangular wave generator 27 may be a multivibrator. The output of the generator is connected by lead 37 to contact member 7A (assuming that the configuration of FIG. 1 is used), and through resistor 39 of low resistance to contact member 7B. Contact electrodes 7A and 7B are designed to have a very large contact area with the earth formation so that the contact impedance will be quite low. The contact electrodes may be platinized electrodes having sufficient diameter to minimize contact impedance by making the contact resistance and the contact impedance as low as possible. (The combination of the contacts and the borehole wall is the equivalent of a resistor and a capacitor in parallel).

Figure 6:
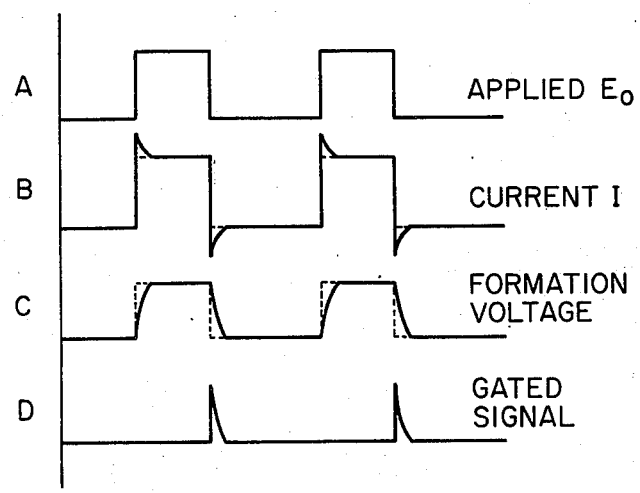
FIG. 6 is a waveform diagram useful in understanding the circuit of FIG. 5A.

The voltage appearing across resistor 39 is applied to the input of gated amplifier 39. A gating signal is derived from lead 37 of generator 27 so that, in effect, the output voltage of generator 27 switches the amplifier 29 on and off. The output signals of the gated amplifier are applied through leads 31 to the recording oscillograph 23 in the surface equipment. The output signals from the gated amplifier are the gated signal as shown in FIG. 6D and a signal equal to the generator 27 output as shown in FIG. 6A. The voltage appearing across resistor 39 is also transmitted to the earth's surface to be recorded by recorder 25. If desired, and if the recording oscillograph is provided with sufficient input circuits, the signal appearing across resistor 39 may be simultaneously recorded by recording oscillograph 23.

Because of the capacitive reactance between the contacts 7A and 7B resulting from the effective capacitor produced by the contacts and the formation in contact therewith, the current passing through resistor 39 will lead the voltage produced by generator 27. The contact impedance of contacts 7A and 7B is very low and will not introduce significant errors into the measurements. The capacitive reactance will be produced almost entirely by the effective capacity, $C_f$, of the earth. The dotted lines in FIG. 6B illustrate the wave form that would be produced were there no capactive reactance in the circuit. The solid rule line represents the current wave form that will typically be produced.

Figure 5B:
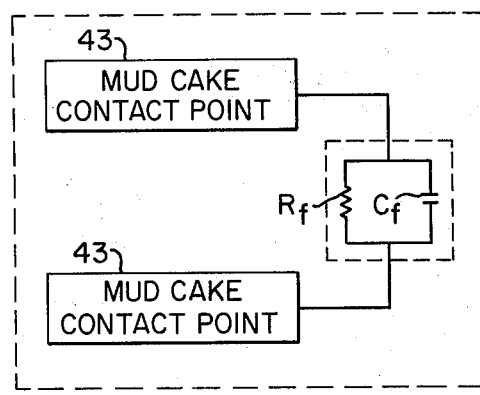
FIG. 5B is an electrical diagram illustrating the equivalent electrical circuit of an earth formation during an electrical resistivity measurement in a borehole useful in understanding the operation of the apparatus of FIGS. 1, 2A, 2B, 3, 4A, and 4B.

The elecrical characteristics of the formation sample can be represented by a capacitive component $C_f$ and a resistive component $R_f$ in parallel as illustrated in FIG. 5B. The current from generator 27 flows through the formation sample and through resistor 39. Designating the pulsed voltage amplitude across resistor 39 as $V_r$ and the resistance value of resistor 39 as R, it is apparent that $$I = \frac{V_r}{R}.$$

If the pulsed voltage amplitude produced by generator 27 is designated as $E_o$, then the formation sample resistance $R_f$ is given by:

$$R_f = \frac{E_o - V_r}{I} = \frac{(E_o - V_r)R}{V_r} \tag{19}$$

From the above it can be seen that the effective resistance of the formation can be determined from the recordations of the voltage generated by generator 27, from the voltage produced across resistor 39, and the resistance of resistor 39.

Manifestly, the time integral $T$ of each voltage pulse appearing at the output of generator 29 and illustrated by the wave form of FIG. 6D is given by the formula:

$$T = IR(R_{eff} C_f) \tag{20}$$

where $$R_{eff} = \frac{R_f R}{R_f + R} \tag{21}$$

so that:

$$C_f = \frac{T}{IRR_{eff}} = \frac{TE_o}{V_r R(E_o - V_r)} \tag{22}$$

From the above it is apparent that the capacitance of an earth sample can be measured using the apparatus described above.

The instrument may be calibrated to measure dielectric constant directly. Initially a number of earth samples having a wide range of dielectric constants are obtained. The samples may have been previously obtained from coring operations in the earth, or they may be specially obtained for the purpose of calibrating the instrument. The dielectric constant of each of the samples is then obtained by techniques well known to the art such as described in the texts: "Solid State Magnetic and Dielectric Devices," Library of Congress Catalog Card Number 59-6769, John Wiley & Sons, New York, 1959; and "Theory of Dielectrics" by H. Frohlich, University Press, Oxford, 1958. For example, an earth sample may be placed between conductive plates of known dimensions and the capacitive reactance of the capacitor resulting therefrom can then be measured. The dielectric constant of the earth sample can be calculated from the area of the plate and the spacing between the plates. Such techniques have been well known to the art for many years and will not be further discussed herein.

After the dielectric constant of the various earth samples have been obtained, these samples or earth samples obtained from the same formations, having the same dielectric constant, are placed in contact with the contacts 7A and 7B. The thickness of each formation sample should be great enough so that the electric lines of force between the pairs of contacts will pass only through the formation sample. The equipment illustrated in FIG. 3A is then actuated so that a substantially rectangular wave pulse train with a frequency spectrum predominantly less than 50 KHz, as illustrated in FIG. 4A, is generated by generator 27.

A number of earth samples of known dielectric constant are successively placed in contact with the electrodes and the area of the integrated signal (which is the time integral T) recorded by oscillograph 23 is measured for each sample. Thus there is obtained a relationship between the integral of the gated signal and the dielectric constant of the earth samples placed between the electrodes. The dielectric constant of any unknown earth sample can be obtained by measuring the parameters described above and correlating with the calibration curve. As stated hereinabove, the dielectric constant of shaly sand formation samples has been observed to vary with frequency; therefore, waveforms having substantially the same frequency spectrum must be used for all dielectric constant measurements made in calibrating instruments, preparing calibration curves, and measuring formation dielectric constant.

As stated earlier, it has been determined that the dielectric constant of a shaly sand formation, measured at frequencies less than about 50 KHz, is related to conductivity due to shaliness. The dielectric constant at 100% water saturation, $K_o$, is related to the conductivity parameter, $C_c$; that is, $K_o \propto C_c$. Since it has been established that $K = K_o S_\omega{}^\nu$, it follows that $K \propto C_c S_\omega{}^\nu$, and that $K$ is related to $C_c S_\omega{}^\nu$ in the same manner that $K_o$ is related to $C_c$. Therefore, the graphical relation between $K_o$ and $C_c$ which can be determined as described herein also defines the relation between $K$ and $C_c S_\omega{}^\nu$, and a value for $C_c S_\omega{}^\nu$ is determinable by correlating the measured value of dielectric constant with said graphical relation.

Figure 7:
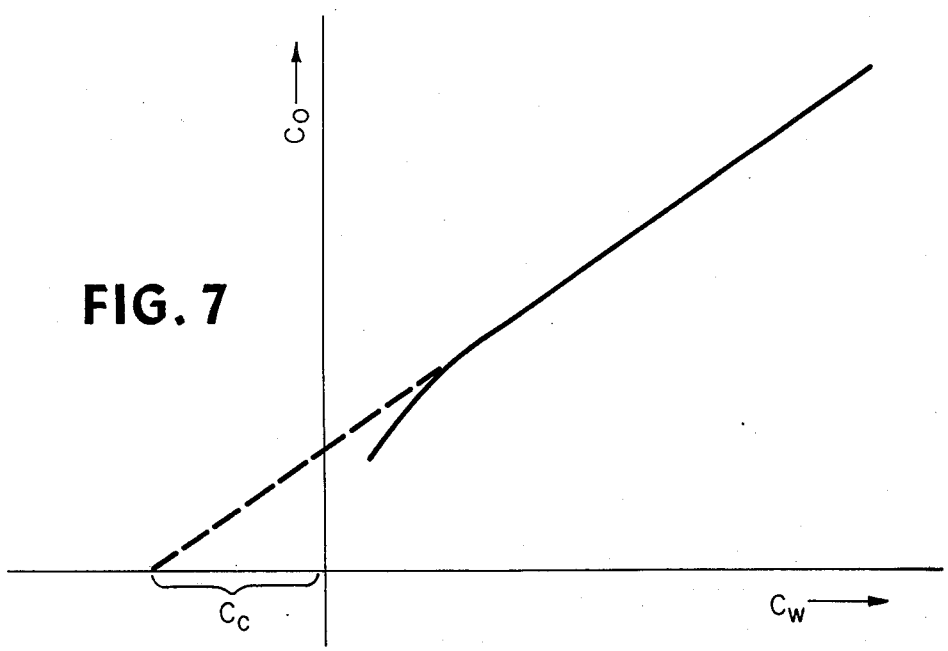
FIG. 7 is the graphical illustration of core conductivity ($C_o$) as a function of equilibrating solution conductivity ($C_\omega$).

The conductivity of a number of 100% water saturated shaly samples, having known values of dielectric constant, is determined at different levels of salinity. The relationship between the conductivity of the saturating solution and the conductivity of water saturated shaly samples will appear similar to FIG. 7. Except for low values of salinity, the change in $C_o$ with a change in $C_\omega$ is linear. For most formations the relation between $C_o$ and $C_\omega$ can be assumed to be linear, and the value of $C_c$, which is the projection of the line on the horizontal axis, can be determined from measurements of $C_o$ at two different salinity levels. The values of $C_c$ for each core sample can be plotted as a function of dielectric constant. From the resulting graph, the value of $C_c$ of an earth sample can be determined by measuring dielectric constant and correlating the measured value with the graph.

As stated hereinabove, the formation factor, $F^*$, is approximately equal to $\phi^{-2}$, so that if the porosity, $\phi$, of a core sample is known, the $C_c$ value for the core sample is determinable from a single measurement of core conductivity if the core is 100% saturated with a saline solution of known conductivity since all the quantities in the relation:

$$C_o = (1/F^*)(C_\omega + C_c) \qquad (23)$$

will be known, except $C_c$.

As explained previously, for at least some shaly sand formations, shaliness conductivity is proportional to cation exchange capacity per unit pore volume, and core conductivity varies according to the relation;

$$C_o = (1/F^*)(C_\omega + BQ_\nu) \qquad (24)$$

For such formations, a relation is determinable between dielectric constant and the conductivity parameter $BQ_\nu$. For a discussion of methods of obtaining values for $B$ and $Q_\nu$, see U. S. Pat. No. 3,895,289, Rickey et al.

It has been determined that, in some instances, $C_c$ varies slightly with formation factor, $F$. For one reservoir, it was determined that:

$$C_c = (0.59 \times 10^{-5} KF^* - 0.76) \text{ mho m}^{-1} \qquad (25)$$

The variation is $C_c$ as a function of dielectric constant and formation factor may be different however, for other types of formations.

It is also well known to those familiar with the prior art that conductivities change with temperature. Care must be taken that appropriate adjustments are made in the correlation of dielectric constant and shaliness conductivity to ensure that the relation corresponds to the temperature of the formation of interest.

The foregoing description of a preferred embodiment of the invention discloses a method of determining the aqueous portion of formation saturants. The remainder of the formation saturants, comprised of electrically inert matter, is therefore equal to $1-SH_\omega$. The electrically inert formation can be hydrocarbons or other matter such as sulfur. Coring operations or other formation testing will indicate the nature of the electrically inert matter. If tests indicate the presence of hydrocarbons, the foregoing disclosure is a very useful method of obtaining quantitative evaluation of the aqueous and hydrocarbon phases of formation saturants in shaly sandstone.

It is understood that if oil based drilling fluids are employed, certain of the foregoing procedures for obtaining partial water saturation of a formation may not be practical. For example, it may be necessary to determine the value of $K_o$ by measuring dielectric constant on cores in the laboratory.

What is claimed is:

1. In a method of electrical well-logging a subsurface shaly sand formation having a first portion thereof saturated with native formation saturants which may include an aqueous saturant and having a second portion thereof adjacent said first portion in which native formation saturants have been at least partially displaced by injected fluids, wherein the relation between dielectric constant and conductivity due to shaliness is utilized to determine the aqueous portion of the native formation saturants, the steps comprising:
    making a first measurement of dielectric content at a selected frequency less than about 50 KHz in said first portion of said formation; and
    making a second measurement of dielectric constant at said selected frequency in said second portion of said formation.

2. The method of claim 1 wherein said measurements of dielectric constant are made adjacent a borehole drilled in said formation.

3. The method of claim 1 wherein at least one of said measurements of dielectric constant is made in cores extracted from said formation.

4. The method of claim 1 wherein said second measurement of dielectric constant is made in a portion of said formation adjacent a borehole drilled in said formation using an aqueous drilling fluid and said injected fluid is comprised of said aqueous drilling fluid.

5. The method of claim 4 wherein making said first measurement of dielectric constant includes the steps of generating an electrical voltage waveform having frequency components predominantly lower than about 50 KHz between two electrodes abutting the wall of said borehole and spaced apart a distance so that the path for electric current and flux lines flowing therebetween is predominantly through portions of said formation saturated with native formation saturants and measuring a characteristic of the resulting current; and making said second measurement of dielectric constant includes the steps of generating an electrical voltage waveform having frequency components predominantly lower than about 50 KHz between two electrodes abutting the wall of said borehole and spaced apart a distance so that the path for electric current and flux lines flowing therebetween is predominantly through portions of said formation saturated with said aqueous drilling fluid and measuring a characteristic of the resulting current.

6. The method of claim 5 wherein the said electrodes are spaced about 5 feet apart for making said first measurement of dielectric constant and about 5 inches apart for making said second measurement of dielectric constant.

7. In a method of electrical well-logging a subsurface shaly sand formation which may be partially saturated with an aqueous saturant and partially with an electrically inert saturant, said formation having a borehole therethrough and having a zone adjacent said borehole in which native formation saturants have been at least partially displaced by injected fluids, wherein the relation between dielectric constant and conductivity due to shaliness is utilized to determine the portions of native formation saturants comprising an aqueous saturant and the portion comprising said electrically inert saturant, the steps comprising:
  making a first measurement of dielectric constant at a frequency less than about 50 KHz in a first portion of said formation which has remained saturated with native formation saturants; and
  making a second measurement of dielectric constant at a frequency less than about 50 KHz in a portion of said formation adjacent said first portion in which native formation saturants have been at least partially displaced by injected fluid.

8. The method of claim 7 wherein said second measurement of dielectric constant is made in a portion of said formation adjacent a borehole drilled in said formation using an aqueous drilling fluid and said injected fluid is comprised of said aqueous drilling fluid.

9. The method of claim 8 wherein at least one of said measurements of dielectric constant is made in cores extracted from said formation.

10. The method of claim 8 wherein making said first measurement of dielectric constant includes the steps of generating an electrical voltage waveform having frequency predominantly lower than about 50 KHz between two electrodes abutting the wall of said borehole and spaced apart a distance so that the path for electric current and flux lines flowing therebetween is predominantly through portions of said formation saturated with native formation saturants and measuring a characteristic of the resulting current; and making said second measurement of dielectric constant includes the steps of generating an electrical voltage waveform having frequency components predominantly lower than about 50 KHz between two electrodes abutting the wall of said borehole and spaced apart a distance so that the path for electric current and flux lines flowing therebetween is predominantly through portions of said formation saturated with said aqueous drilling fluid and measuring a characteristic of the drilling current.

11. The method of claim 10 wherein the said electrodes are spaced about 5 inches apart for making said first measurement of dielectric constant and about 5 feet apart for making said second measurement of dielectric constant.

12. In a method of electrical well-logging a substance shaly sand formation having a first portion thereof saturated partially with an aqueous saturant and partially with electrically inert matter, and having a second portion thereof adjacent said first portion saturated with an aqueous saturant, wherein the relation $K = K_o S_\omega{}^p$ is utilized for determining partial water saturation in said first portion of said formation, wherein
  $K$ = dielectric constant
  $K_o$ = dielectric constant a 100% water saturation
  $S_\omega$ = partial water saturation
  $p$ = shaliness exponent
the steps comprising:
  making a first measurement of dielectric constant at frequencies lower than about 50 KHz in said first portion of said formation whereby a value $K$ is determined; and
  making a second measurement of dielectric constant at frequencies lower than about 50 KHz in said second portion of said formation whereby a value of $K_o$ is determined.

13. The method of claim 12 wherein said measurements of dielectric constant are made adjacent a borehole drilled in said formation.

14. The method of claim 12 wherein at least one of said measurements of dielectric constant is made in cores extracted from said formation.

15. In a method of electrical well-logging of a subsurface shaly sand formation saturated with native formation saturants comprised partially of water and partially of an electrically inert fluid, wherein the relation $K = K_o S_\omega{}^p$ is utilized for determining partial water satuation, wherein
  $K$ = dielectric constant
  $K_o$ = dielectric constant at 100% water saturation
  $S_\omega$ = partial water saturation
  $p$ = shaliness exponent
the steps comprising:
  making a first measurement of dielectric constant at a selected frequency lower than about 50 KHz at a first location in said formation wherein said native formation saturants have been displaced by an aqueous saturant whereby a value of $K_o$ is determined; and
  making a second measurement of dielectric constant at said selected frequency in a second location in said formation adjacent said first location, saturated with native formation saturants, whereby a value of $K$ is determined.

16. The method of claim 15 wherein said first measurement of dielectric constant is made in a portion of said formation adjacent a borehole drilled in said formation using an aqueous drilling fluid and said aqueous saturant is comprised of said aqueous drilling fluid.

17. The method of claim 16 wherein making said first measurement of dielectric constant includes the steps of generating an electrical voltage waveform having frequency components predominantly lower than about 50 KHz between two electrodes abutting the wall of said borehole and spaced apart a distance so that the path for electric current and flux lines flowing therebetween is predominantly through portions of said formation saturated with said aqueous drilling fluids and measuring a characteristic of the resulting current; and making said second measurement of dielectric constant includes the steps of generating an electrical voltage waveform having frequency components predominantly lower than about 50 KHz between two electrodes abutting the wall of said borehole and spaced apart a distance so that the path for electric current and flux lines flowing therebetween is predominantly through portions of said formation saturated with said native formation saturants and measuring a characteristic of the resulting current.

18. The method of claim 17 wherein the said electrodes are spaced about 5 inches apart for making said first measurement of dielectric constant and about 5 feet apart for making said second measurement of dielectric constant.

19. In a method of electrical well-logging of a subsurface shaly sand formation saturated with native formation saturants comprised partially of water and partially of fluid hydrocarbons, wherein the relations, $K = K_o S_\omega{}^p$ and $S_H = 1 - S_\omega$ are utilized for determining partial water saturation and partial hydrocarbon saturation, wherein
$K$ = dielectric constant
$K_o$ = dielectric constant at 100% water saturation
$S_\omega$ = partial water saturation
$p$ = shaliness exponent
$S_H$ = partial hydrocarbon saturation
the steps comprising:
 making a first measurement of dielectric constant utilizing a selected waveform having frequency components predominantly lower than about 50 KHz at a first location in said formation wherein said native formation saturants have been displaced by an aqueous saturant, thereby obtaining a value for $K_o$; and
 making a second measurement of dielectric constant utilizing said selected waveform at a second location in said formation adjacent said first location, saturated with native formation saturants, thereby obtaining a value for $K$.

20. The method of claim 19 wherein said first measurement of dielectric constant is made in a portion of said formation adjacent a borehole drilled in said formation using an aqueous drilling fluid and said aqueous saturant is comprised of said aqueous drilling fluid.

21. The method of claim 20 wherein making said first measurement of dielectric constant the steps of generating an electrical voltage waveform having frequency components predominantly lower than about 50 KHz between two electrodes abutting the wall of said borehole and spaced apart a distance so that the path for electric current and flux lines flowing therebetween is predominantly through portions of said formation saturated with said aqueous drilling fluid and measuring a characteristic of the resulting current; and making said second measurement of dielectric constant includes the steps of generating an electrical voltage waveform having frequency components predominantly lower than about 50 KHz between two electrodes abutting the wall of said borehole and spaced apart a distance so that the path for electric current and flux lines flowing therebetween is predominantly through portions of said formation saturated with said native formation saturants and measuring a characteristic of the resulting current.

22. In a method of electrical well-logging of a subsurface shaly sand formation saturated with native formation saturants comprised partially of water and partially of an electrically inert fluid wherein the value of $p$ for said formation is known, the steps comprising:
 making a first measurement of dielectric constant at frequencies lower than about 50 KHz at a first location in said formation wherein said native formation saturants have been displaced by an aqueous saturant whereby a value for $K_o$ is determined;
 making a second measurement of dielectric constant at frequencies lower than about 50 KHz in a second location in said formation, adjacent said first location, saturated with native formation fluids whereby a value for $K$ is determined; and
 utilizing the relation $K = K_o S_\omega{}^p$ wherein:
$K$ = dielectric constant
$K_o$ = dielectric constant at 100% water saturation
$S_\omega$ = partial water saturation
$p$ = shaliness exponent
to determine the partial water saturation, $S_\omega$ of said formation.

23. The method of claim 22 wherein the value of $p$ is about 0.8.

24. The method of claim 23 wherein said first measurement of dielectric constant is made in a portion of said formation adjacent a borehole drilled in said formation and said aqueous saturant is comprised of drilling fluids.

25. The method of claim 24 wherein making said first measurement of dielectric constant includes the steps of generating an electrical voltage waveform having frequency components predominantly lower than about 50 KHz between two electrodes abutting the wall of said borehole and spaced apart a distance so that the path for electric current and flux lines flowing therebetween is predominantly through portions of said formation saturated with said aqueous drilling fluid and measuring a characteristic of the resulting current; and making said second measurement of dielectric constant includes the steps of generating an electrical voltage waveform having frequency components predominantly lower than about 50 KHz between two electrodes abutting the wall of said borehole and spaced apart a distance so that the path for electric current and flux lines flowing therebetween is predominantly through portions of said formation saturated with said native formation saturants and measuring a characteristic of the resulting current.

26. The method of claim 25 wherein the said electrodes are spaced about 5 inches apart for making said first measurement of dielectric constant and about 5 feet apart for making said second measurement of dielectric constant.

27. In a method for determining the value of $p$ for a type of shaly sand subsurface formation wherein a core sample is extracted from said type of formation, the steps of:
 measuring dielectric constant at a frequency lower than about 50 KHz of said core sample at selected levels of partial water saturation, thereby determining values for dielectric constant corresponding to various levels of partial saturation;
 utilizing said corresponding values of dielectric constant and partial water saturation to graphically determine the value of $p$ for said type of formation, from the relation $K = K_o S_\omega{}^p$ wherein:
$K$ = dielectric constant
$K_o$ = dielectric constant at 100% water saturation
$S_\omega$ = partial water saturation, and
$p$ = shaliness exponent 28. A method of electrical well-logging a portion of a shaly sand subsurface formation saturated with native formation saturants comprised partially of water and partially of an electrically inert fluid, comprising the steps of:
 extracting a core sample from said formation;

measuring dielectric constant of said core sample at a selected frequency lower than about 50 KHz at selected levels of partial water saturation thereby determining values for dielectric constant corresponding to said selected levels of partial water saturation;

utilizing said corresponding values of dielectric constant and partial water saturation to graphically determine the value of $p$ for said portion of said formation, from the relation, $K = K_o S_\omega{}^p$ wherein:

$K$ = dielectric constant
$K_o$ = dielectric constant at 100% water saturation
$S_\omega$ = partial water saturation
$p$ = shaliness exponent making a first measurement of dielectric constant at said selected frequency at a first location in said formation wherein said native formation saturants have been displaced by an aqueous saturant whereby a value for $K_o$ is determined;

making a second measurement of dielectric constant at said selected frequency in a second location in said formation adjacent said first location, saturated with native formation fluids whereby a value for $K$ is determined; and determining the partial water saturation, $S_\omega$, of said portion of said formation, from the relation $K = K_o S_\omega{}^p$.

29. The method of claim 28 wherein said first measurement of dielectric constant is made in a portion of said formation adjacent a borehole drilled in said formation using an aqueous drilling fluid and said aqueous saturant is comprised of said aqueous drilling fluid.

* * * * *